United States Patent [19]
Kletzl

[11] Patent Number: 6,064,545
[45] Date of Patent: May 16, 2000

[54] RECORDING AND/OR REPRODUCING SYSTEM INCLUDING A MAGNETIC-TAPE CASSETTE ENGAGEABLE BY A TAPE PULL-OUT ELEMENT POSITIONED BY A MOVABLE HOLDER

[75] Inventor: Franz Kletzl, Mank, Austria

[73] Assignee: U.S. Philips Corporation, New York, N.Y.

[21] Appl. No.: 09/054,109

[22] Filed: Apr. 2, 1998

[30] Foreign Application Priority Data

Apr. 3, 1997 [EP] European Pat. Off. ............. 97890062

[51] Int. Cl.[7] ........................... G11B 5/008; G11B 15/66
[52] U.S. Cl. .............................................. 360/95; 242/332
[58] Field of Search ................... 360/95; 242/332–332.8

[56] References Cited

U.S. PATENT DOCUMENTS 4,477,851  10/1984  Dalziel ........................................ 360/5

FOREIGN PATENT DOCUMENTS

0228369B1  7/1987  European Pat. Off. .......... G03B 1/04
0229052B1  10/1991  European Pat. Off. ........ B23P 19/04

*Primary Examiner*—A. J. Heinz
*Attorney, Agent, or Firm*—David R. Treacy

[57] ABSTRACT

A scanning device for a tape cassette having a coupling element at an end of the tape which can be pulled from the cassette in a pull-out direction by a pull-out element in the device. The coupling element couples to the pull-out element as a result of relative movement of the cassette with respect to the pull-out element in a direction transverse to a main wall of the cassette, so as to form an assembly having a circular segment cross-section which can engage in a corresponding recess of a take-up reel in the device. The pull-out element is held in a standby position by a holder which is pivotably connected to the device housing.

28 Claims, 7 Drawing Sheets

RECORDING AND/OR REPRODUCING SYSTEM INCLUDING A MAGNETIC-TAPE CASSETTE ENGAGEABLE BY A TAPE PULL-OUT ELEMENT POSITIONED BY A MOVABLE HOLDER

BACKGROUND OF THE INVENTION

The invention relates to a recording and reproducing system, comprising a recording and/or reproducing device and a cassette adapted to be inserted into the recording and/or reproducing device, which cassette comprises a rectangular parallelepiped housing having two mutually parallel main walls, in which housing a magnetic tape is accommodated, and in which the cassette accommodates a supply reel for storing the magnetic tape, which supply reel has a reel hub to which the magnetic tape is connected at one end, and further accommodates a coupling element, to which the magnetic tape is connected at its other end and which can be positioned into a coupling position in the cassette with the aid of positioning means, and in which a tape transport path has been defined in the recording and/or reproducing device, which tape transport path extends from a compartment for receiving the inserted cassette, via a magnetic head for scanning the magnetic tape and provided in the recording and/or reproducing device, to a rotationally drivable take-up reel for taking up the magnetic tape and provided in the recording and/or reproducing device, which take-up reel has a reel hub to which a pull-out tape is connected at its end nearest the take-up reel, which pull-out tape can be guided along the tape transport path and is connected to a pull-out element at its other end which is remote from the take-up reel, which pull-out element can be held in a standby position with the aid of holding means provided in the recording and/or reproducing device and, in its standby position, can be coupled to the coupling element of the inserted cassette in the coupling position of said coupling element, in such a manner that the coupling element and the magnetic tape can be pulled out of the inserted cassette in a pull-out direction and can be pulled up to the take-up reel along the tape transport path in that the take-up reel is rotationally driven—by means of the take-up reel, the pull-out tape, the pull-out element and the coupling element of the inserted cassette, which coupling element has been coupled to the pull-out element.

The invention further relates to a recording and/or reproducing device adapted to receive a cassette, which cassette comprises a rectangular parallelepiped housing having two mutually parallel main walls and accommodates a magnetic tape, and in which device a tape transport path for a magnetic tape has been defined, which tape transport path extends from a compartment for receiving an inserted cassette, via a magnetic head for scanning a magnetic tape, to a rotationally drivable take-up reel for taking up a magnetic tape and having a reel hub to which a pull-out tape is connected at its end nearest the take-up reel, which pull-out tape can be guided along the tape transport path, and is connected to a pull-out element at its other end which is remote from the take-up reel, which pull-out element can be held in a standby position with the aid of holding means and is adapted to be coupled to a coupling element of an inserted cassette, so as to pull such a coupling element and a magnetic tape out of an inserted cassette in a pull-out direction and up to the take-up reel along the tape transport path after such coupling in that the take-up reel is rotationally driven—by means of the take-up reel, the pull-out tape, the pull-out element and a coupling element coupled to the pull-out element.

The invention further relates to a cassette, which comprises a rectangular parallelepiped housing having two mutually parallel main walls and which accommodates a magnetic tape, and which comprises a supply reel for storing the magnetic tape, which supply reel has a reel hub to which the magnetic tape is connected at one end, and further comprises a coupling element, to which the magnetic tape is connected at its other end and which can be positioned into a coupling position in the cassette with the aid of positioning means.

A recording and/or reproducing system of the type defined in the first paragraph, a recording and/or reproducing device of the type defined in the second paragraph, and a cassette of the type defined in the third paragraph are commercially available and are thus known. For the known system, the known device and the known cassette reference can also be made to the two documents EP 0 229 052 B1 and EP 0 228 369 B1.

In the known system the pull-out element, which is connected to the pull-out tape of the device, is formed by an end portion of the pull-out tape, which has a leading part formed with undercuts and which has a substantially elongate rectangular aperture adapted to cooperate with a separate actuating mechanism accommodated in the known device, this separate actuating mechanism enabling the end portion of the pull-out tape—i.e. the pull-out element of the pull-out tape—to be held in its standby position. Moreover, with respect to the known system it is to be noted that the coupling element of the known cassette is formed by a further pull-out tape which is connected to the magnetic tape and which at the location of its free end has a substantially oval or elliptical aperture adapted to cooperate with the undercut leading part of the end portion of the pull-out tape of the device. In the known system the pull-out element formed by the end portion of the pull-out tape of the device should not only be held in its standby position by means of the separate actuating device but also has the drawback that, after the known cassette has been loaded into the known device of the system, said pull-out element should be moved from the standby position into a coupling position, during which movement the undercut leading part of the end portion of the pull-out tape is moved through the oval aperture in the further pull-out tape of the cassette, after which by means of the actuating device the leading part is held in such a position that, when the take-up reel of the known device is subsequently driven and, as a result of this, the pull-out tape of the device is driven, the undercuts in the leading part of this pull-out tape engage against the boundaries of the oval aperture in the further pull-out tape of the cassette, the undercuts in the leading part of the pull-out tape of the device engaging behind the further pull-out tape of the cassette and thereby providing a coupling between the pull-out tape of the device and the further pull-out tape of the cassette. For the known system, the know device and the known cassette it is therefore necessary that the known device of the known system comprises a separate actuating device for moving the pull-out element formed by the end portion of the pull-out tape from its standby position into its coupling position. Such a separate actuating device represents a substantial expense and also involves the risk that a correct and reliable coupling between the pull-out tape of the device and the further pull-out tape of the cassette is no longer guaranteed after a longer operating time.

SUMMARY OF THE INVENTION

It is an object of the invention to preclude the aforementioned problems and to improve a recording and/or reproducing system of the type defined in the first paragraph, a recording and/or reproducing device of the type defined in the second paragraph, and a cassette of the type defined in the third paragraph, and to realize an improved recording and/or reproducing system, an improved recording and/or reproducing device, and an improved cassette in a simple manner and at low cost, which guarantee a simple and reliable coupling between an pull-out element of the device and a coupling element of the cassette.

According to the invention, in order to achieve the above object, a recording and/or reproducing system of the type defined in the first paragraph is characterized in that the recording and/or reproducing device comprises actuating means capable of producing a relative movement—in a direction of movement oriented transversely to the main walls of the cassette—between the cassette and the pull-out element of the recording and/or reproducing device, which pull-out element is held in its standby position with the aid of the holding means, during an insertion process of the cassette, at least towards the end of the insertion process, and the coupling element of the cassette and the pull-out element of the recording and/or reproducing device comprise coupling means which are adapted to automatically establish a coupling, without any additional means being required, during said relative movement in which the coupling element of the cassette is positioned in its coupling position with the aid of the positioning means and the pull-out element of the recording and/or reproducing device is held in its standby position with the aid of the holding means. The measures in accordance with the invention as defined above ensure in a particularly simple and, consequently, cheap manner that for coupling the pull-out element of the device and the coupling element of the cassette no additional means apart from these two elements themselves are required because these two elements are coupled automatically without any additional means towards the end of a loading cycle of a cassette in accordance with the invention into a recording and/or reproducing device in accordance with the invention. This has the advantage that a recording and/or reproducing system in accordance with the invention and a recording and/or reproducing device in accordance with the invention do not require a separate actuating device to move the pull-out element of the device from its standby position into a coupling position because coupling of the pull-out element of the device to the coupling element of the cassette is effected while the pull-out element is in its standby position.

In a recording and/or reproducing system in accordance with the invention having the characteristic features defined in claim 29 it has proved to be advantageous if in addition the measures defined in the appendant claim 30 are taken. Such an embodiment has the advantage of a high reliability and a simple coupling of the pull-out element of the device and the coupling element of the cassette.

In a recording and/or reproducing system in accordance with the invention having the characteristic features defined in the appendant claim 30 it has proved to be particularly advantageous if it in addition the measures defined in the appendant claim 31 are taken. As a result of this, it is possible to make the coupling element of the cassette cheaper than the pull-out element of the device, which has the great advantage that the cheaper part is arranged in the cassette which is manufactured in huge quantities, the more expensive part being arranged in recording and/or reproducing devices which are manufactured in smaller quantities than the cassettes. This also ensures both a smooth engagement of the coupling pin of the coupling element of the cassette into the coupling hole in the pull-out element of the device and a reliable retention of the coupling pin in the coupling hole.

In a recording and/or reproducing system in accordance with the invention having the characteristic features defined in claim 29 it has also proved to be very advantageous if in addition the measures defined in the appendant claim 32 are taken. This guarantees a simple yet reliable and accurate retention of the pull-out element in its standby position. It is to be noted that the measures as defined in the appendant claim 32 can also be applied advantageously in recording and/or reproducing systems in accordance with the invention as defined in claims 30 and 31.

In a recording and/or reproducing system in accordance with the invention having the characteristic features defined in the appendant claim 32 it has further proved to be very advantageous if in addition the measures defined in the appendant claim 34 are taken. In this way, it is achieved that the retaining means serve not only for retaining the pull-out element but also for guiding the pull-out element when its movement in the pull-out direction begins.

In a recording and/or reproducing system in accordance with the invention having the characteristic features defined in the appendant claim 34 it has proved to be advantageous if in addition the measures defined in the appendant claim 35 are taken. This ensures that the movement of the coupling element in the pull-out direction is not impeded when this movement begins.

In a recording and/or reproducing system in accordance with the invention having the characteristic features defined in the appendant claim 34 it has also proved to be very advantageous if in addition the measures defined in the appendant claim 36 are taken. By means of the bounding walls of the two guide slots, which extend transversely to the pull-out direction, it is thus assured in a simple manner that during the return movement of the coupling element into its cassette and the resulting return of the pull-out element into its standby position the pull-out element is only movable into and not beyond its standby position. It is to be noted that the measures as defined in the appendant claim 36 can also be used advantageously in a recording and/or reproducing system in accordance with the invention as defined in claim 35.

In a recording and/or reproducing system in accordance with the invention having the characteristic features defined in the appendant claim 32 it has also proved to be very advantageous if in addition the measures defined in the appendant claim 37 are taken. Thus, it is assured by simple means that the pull-out element of the recording and/or reproducing device remains in its standby position when no cassette has been inserted. It is to be noted that the measures as defined in the appendant claim 37 can also be used advantageously in recording and/or reproducing systems in accordance with the invention as defined in claims 34 to 36.

In a recording and/or reproducing system in accordance with the invention having the characteristic features defined in the appendant claim 37 it has also proved to be advantageous if in addition the measures defined in the appendant claim 38 are taken. This has the advantage that a particularly simple and reliable construction is obtained.

In a recording and/or reproducing system in accordance with the invention having the characteristic features defined in the appendant claim 32 it has also proved to be very advantageous if in addition the measures defined in the appendant claim 39 are taken. Thus, it is achieved by means of the actuating projection that when a cassette is inserted into a recording and/or reproducing device the coupling element is applied to the positioning means for the coupling element so that, even in the case that the coupling element has been moved slightly out of its coupling position as a result of unfavorable influences exerted on the cassette, it is ensured that the coupling element is moved into its coupling position by means of the actuating projection prior to coupling. It is to be noted that the measures as defined in the appendant claim 39 can also be used advantageously in recording and/or reproducing systems in accordance with the invention as defined in claims 34 to 38.

In a recording and/or reproducing system in accordance with the invention having the characteristic features defined in the claim 29 it has also proved to be very advantageous if in addition the measures defined in the appendant claim 40 are taken. Thus, it is achieved that when the assembly comprising the pull-out element and the coupling element is connected to the take-up reel of the recording and/or reproducing device the circumferential surface of the reel hub of the take-up reel has a substantially undisturbed cylindrical shape, which precludes undesirable influences on the magnetic tape wound on the reel hub of the take-up reel. It is to be noted that the measures as defined in the appendant claim 40 can also be used advantageously in recording and/or reproducing systems in accordance with the invention as defined in Claims 30 to 39.

In a recording and/or reproducing system in accordance with the invention having the characteristic features defined in the appendant claim 12 it has also proved to be very advantageous if in addition the measures defined in the appendant claim 41 are taken. This ensures a very accurate positioning of the assembly comprising the pull-out element and the coupling element at the location of the reel hub of the take-up reel.

According to the invention, in order to achieve the object mentioned hereinbefore, a recording and/or reproducing device of the type defined in the second paragraph is characterized in that actuating means have been provided which are capable of producing a relative movement—in a direction of movement oriented transversely to the main walls of a cassette—between a cassette and the pull-out element of the recording and/or reproducing device, which pull-out element is held in its standby position with the aid of the holding means, during an insertion process of the cassette, at least towards the end of the insertion process, and the pull-out element of the recording and/or reproducing device comprises coupling means which are adapted to automatically establish a coupling, without any additional means being required, during said relative movement in which the pull-out element is held in its standby position with the aid of the holding means. Such a recording and/or reproducing device in accordance with the invention has advantages corresponding to those set forth hereinbefore for a recording and/or reproducing system in accordance with the invention as defined in claim 29.

As regards the advantageous variants, defined in claims 43 to 53, of a recording and/or reproducing device in accordance with the invention having the characteristic features defined in claim 32, it is only mentioned briefly that these variants have advantages corresponding to those set forth hereinbefore for the variants of a recording and/or reproducing device in accordance with the invention as defined in claims 30 to 41.

According to the invention, in order to achieve the object mentioned hereinbefore, a cassette of the type defined in the third paragraph is characterized in that the coupling element of the cassette comprises coupling means which are adapted to automatically establish, without any additional means being required, a coupling to coupling means of a pull-out element of a recording and/or reproducing device during a relative movement—which occurs between the cassette and a pull-out element of the recording and/or reproducing device in a direction of movement transverse to the main walls of the cassette, at least towards the end of the insertion of the cassette into a recording and/or reproducing device when the cassette inserted in order to put the cassette into operation—, during which relative movement the coupling element of the cassette is positioned in its coupling position with the aid of the positioning means. Such a cassette in accordance with the invention has advantages corresponding to those set forth hereinbefore for a recording and/or reproducing system in accordance with the invention as defined in claim 29.

As regards the advantages of the advantageous variants, defined in the appendant claims 26, 27 and 28, of a cassette in accordance with the invention having the characteristic features defined in claim 25, reference is made to the advantages set forth hereinbefore for the variants of a recording and/or reproducing system in accordance with the invention as defined in claims 2, 4 and 7.

The above-mentioned as well as further aspects of the invention will become apparent from the embodiment described hereinafter by way of example and will be elucidated by means of this embodiment.

BRIEF DESCRIPTION OF THE DRAWING

The invention will now be described in more detail with reference to the drawings, which show an embodiment to which the invention is not limited.

In FIG. 1 the cassette is shown in a position in which it has been introduced only partly into the cassette holder, not shown.

DESCRIPTION OF THE PREFERRED EMBODIMENT

FIGS. 1 to 4 show a recording and reproducing system 1, hereinafter briefly referred to as the system 1. The system 1 comprises a recording and reproducing device 2, hereinafter briefly referred to as the device 2, and a cassette 3, which can be loaded into the device 2.

Figure 2:
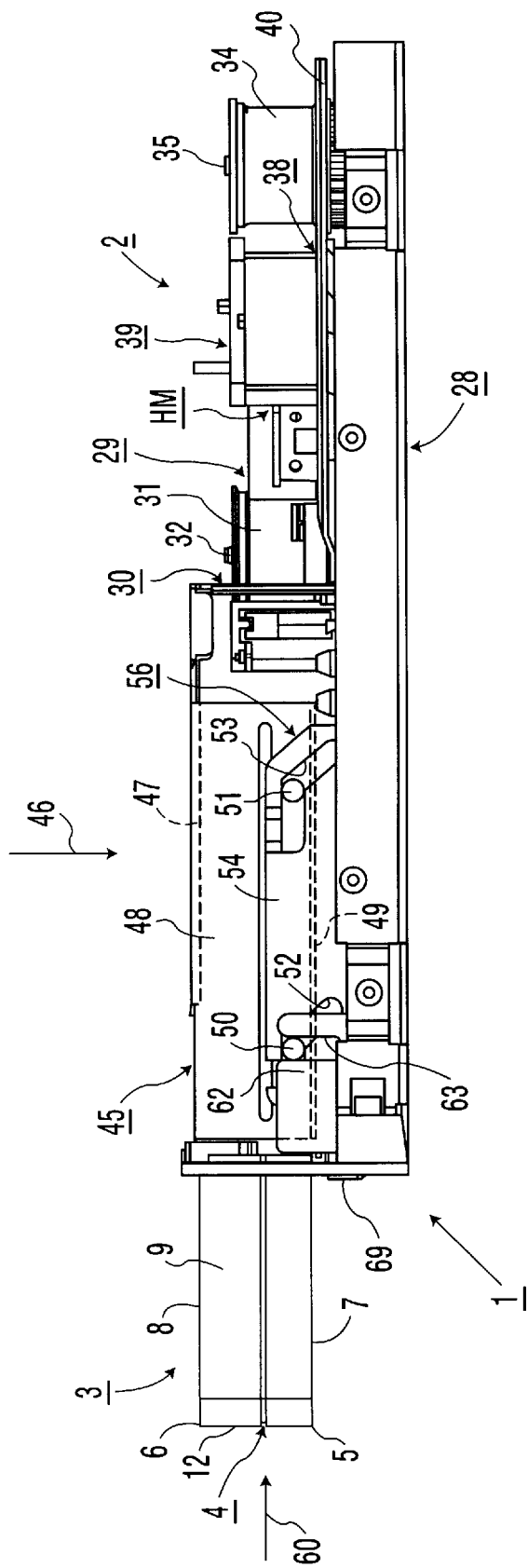
FIG. 2 is a side view taken as indicated by an arrow II in FIG. 1 and showing the recording and reproducing system of FIG. 1, FIG. 2 showing the movable cassette holder and showing the cassette, similarly to FIG. 1, in a position in which it has been introduced only partly into the movable cassette holder.
Figure 3:
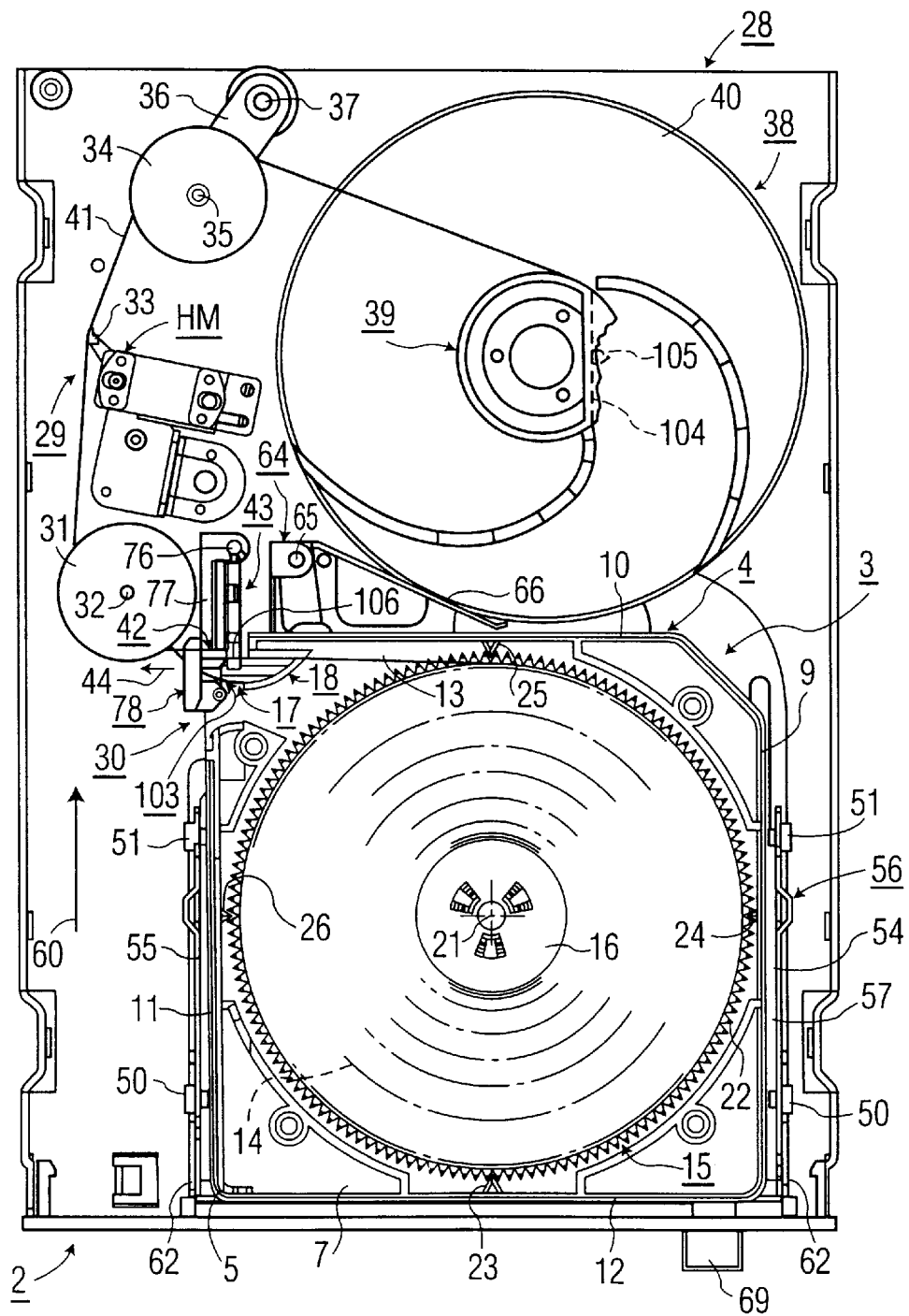
FIG. 3, similarly to FIG. 1, shows the recording and reproducing system of FIGS. 1 and 2, the cassette having been inserted completely into the recording and reproducing device and being in an operating position in which a coupling element accommodated in the cassette has been coupled to an pull-out element of the recording and reproducing device and these two elements are situated at the location of the cassette.
Figure 4:
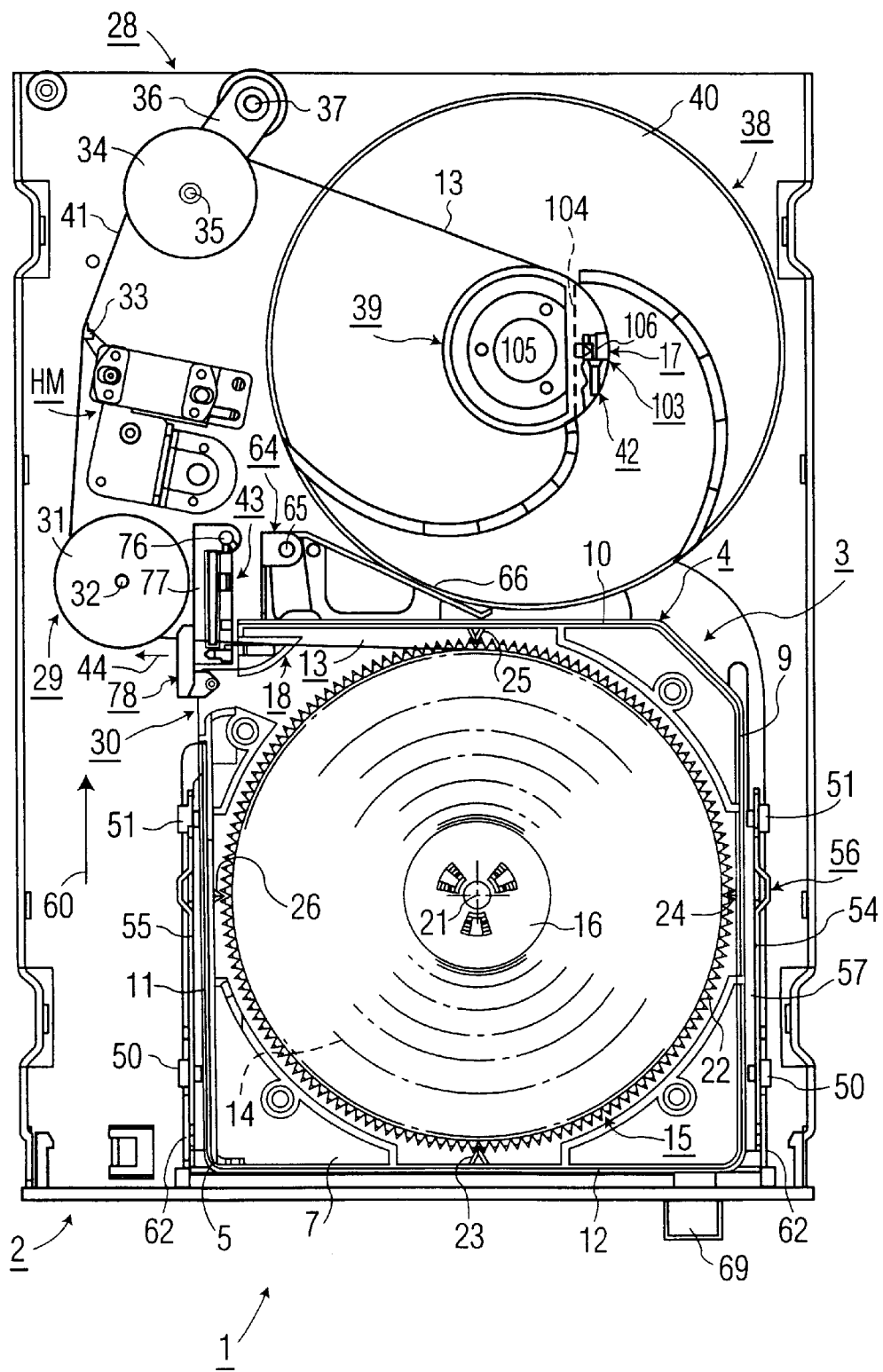
FIG. 4, similarly to FIG. 3, shows the recording and reproducing system of FIGS. 1, 2 and 3, the coupling element and the pull-out element being situated in a recess in the reel hub of a take-up reel of the recording and reproducing device, which recess has the shape of a segment of a circle.
Figure 8:
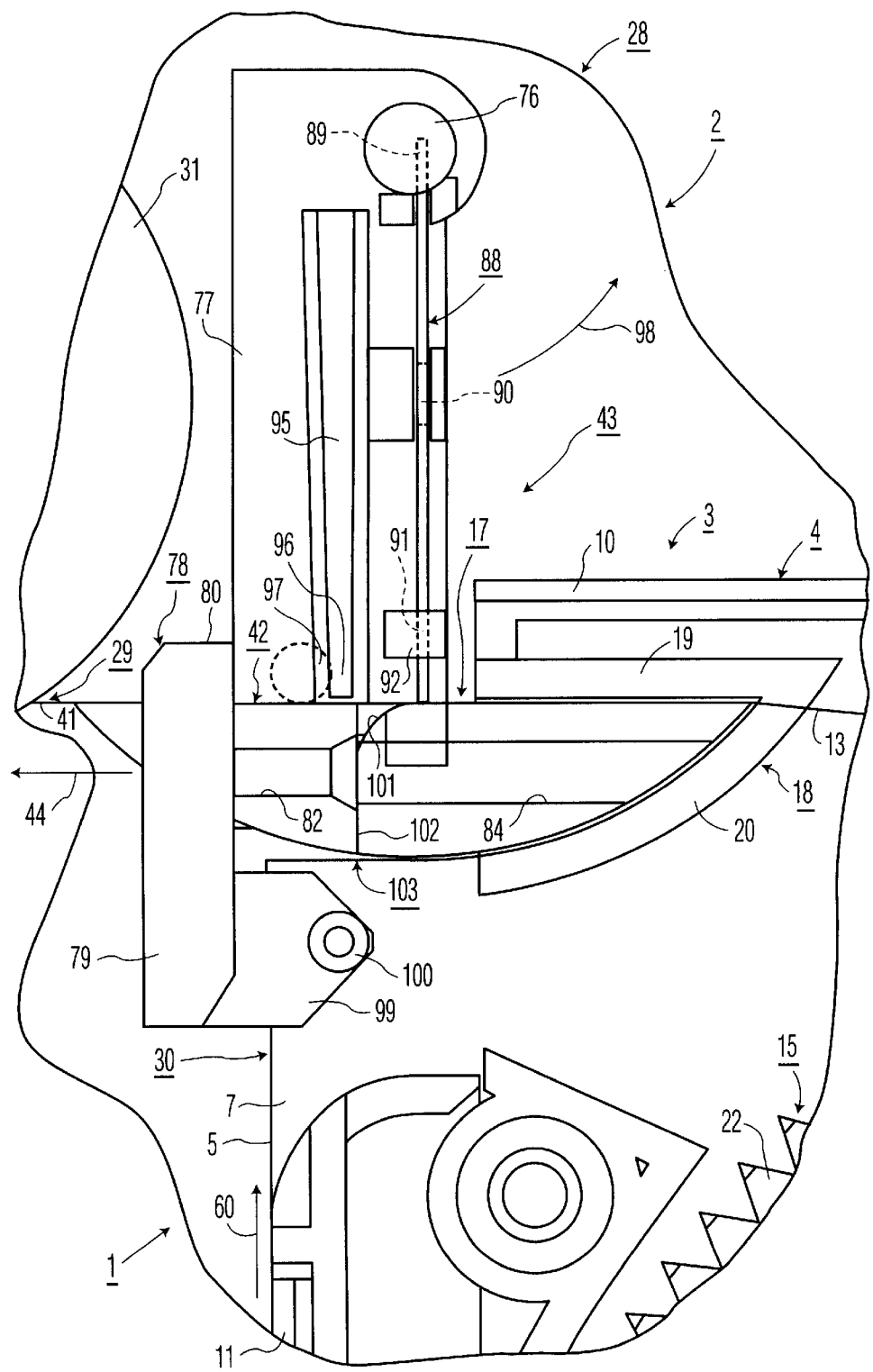
FIG. 8 shows a part of the recording and reproducing device and the cassette of the recording and reproducing system of FIGS. 1 to 4 in a plan view to an enlarged scale in comparison with FIG. 3, which part essentially concerns holding means for holding the pull-out element in a standby position in which the pull-out element is engageable with the coupling element of the cassette.
Figure 9:
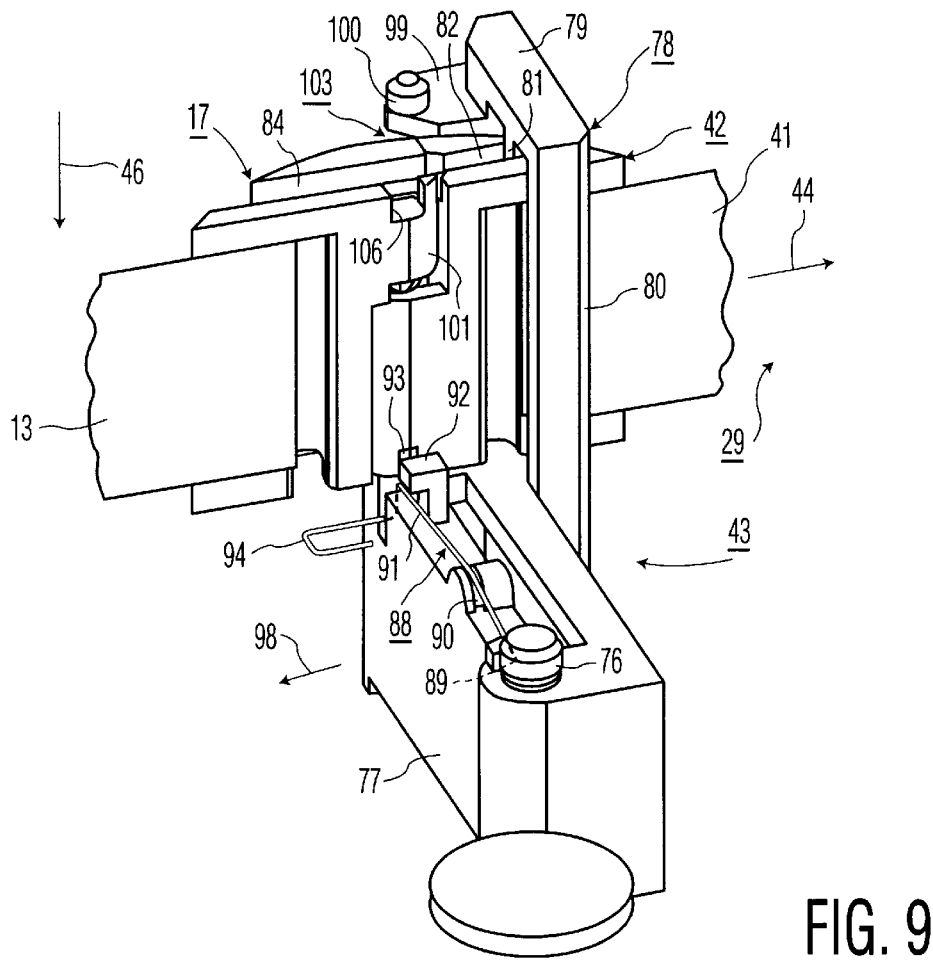
FIG. 9 is an oblique view of the holding means for holding the pull-out element in its standby position, which means have already been shown in an enlarged-scale plan view in FIG. 8.

The cassette 3 has a rectangular parallelepided housing 4, which—as is visible in FIG. 2—comprises a tray-shaped lower housing section 5 and a likewise tray-shaped upper housing section 6. In FIGS. 3, 4 and 8 the cassette 3 is shown with the upper housing section 6 removed to expose the parts accommodated in the cassette 3. The housing 4 of the cassette 3 has two main walls 7 and 8 parallel to one another, i.e. a bottom wall 7 and an upper wall 8, as well as four side walls 9, 10, 11 and 12, which interconnect the two mains walls 7 and 8.

The cassette 3 accommodates a magnetic tape 13. To store the magnetic tape 13 as a tape spool 14 the cassette 3 comprises a supply reel 15. The supply reel 15 has a reel hub 16 to which the magnetic tape 13 is connected at one end in a manner, not shown.

The cassette 3 further accommodates a coupling element 17, whose construction will be described in detail hereinafter. The magnetic tape 13 is connected to the coupling element 17 at its other end. With the aid of positioning means 18 the coupling element 17 can be positioned in a coupling position, which corresponds to the position of the coupling element 17 as shown in plan view in FIGS. 3 and 8. The positioning means 18 comprise two positioning walls 19 and 20, which project from the bottom wall 7 of the cassette 3, the wall 19 being straight and the positioning wall 20 being shaped as an arc of circle, which positioning walls together form a wedge-like configuration adapted to the cross-sectional shape of the coupling element 17. The positioning means 18 have positioning walls corresponding in shape to the positioning walls 19 and 20 and projecting from the upper wall 8 of the cassette 3.

In the cassette 3 the supply reel 15 is movable parallel to the orientation of its reel axis 21 from a rest position, in which the supply reel 15 lies on the bottom wall 9, into a drive position, in which the supply reel 15 has been lifted off the bottom wall 9. In the rest position teeth 22, which project radially from the lower reel flange of the supply reel 15, mesh with latching teeth 23, 24, 25 and 26 provided in the lower housing section 5, thus inhibiting a rotation of the supply reel. In the drive position of the supply reel 15 the supply reel 15 is rotationally drivable about the reel axis 21. The supply reel 15 is lifted off the bottom wall 9 of the cassette 3 by means of a reel drive device 27 provided in the device 2 and shown in FIG. 1. The reel drive device 27 is mounted on a substantially plate-shaped chassis 28 of the device 2 and can be brought into operational engagement with the reel hub 16 of the supply reel 15 through an aperture, not shown, in the bottom wall 9 of the cassette 3.

In the device 2 of the system 1 a tape transport path 29 has been defined for the magnetic tape 13. The tape transport path 29 extends from a compartment 30 for receiving the inserted cassette 3 to a take-up reel 38, which is rotationally drivable by means of a reel drive motor, which is secured to the chassis 28 and is not shown in the Figures, via a tape guide roller 31, which is mounted on the chassis 28 so as to be rotatable about a spindle 32, via a magnetic head 33 provided in the device 2 to scan the magnetic tape 13, and via a further tape guide roller 34, which is mounted for rotation about a spindle 35, the spindle 35 being carried by a lever 36, which is supported on the chassis 28 so as to be pivotable about a spindle 37. As regards the magnetic head 33, it is to be noted that this magnetic head 33 is a so-called multi-track magnetic head by means of which a plurality of tracks which adjoin one another on the magnetic tape 13 in the longitudinal direction of the magnetic tape 13 and which, in addition, is adjustable in height by means of an actuating device HM transversely to the longitudinal direction of the magnetic tape 13, but which will not be described in any further detail because it is not relevant in the present case.

The take-up reel 38 has a reel hub 39 from which a reel flange 40 extends in radial directions at its side which faces the chassis 28. In a manner not shown, an pull-out tape 41 is connected to the reel hub 39 of the take-up reel 38 at its end nearest the take-up reel 38. The pull-out tape 41 can be guided along the tape transport path 29 described above, as is apparent from FIGS. 1 and 3. At its other end which is remote from the take-up reel 38 the pull-out tape 41 is connected to an pull-out element 42 in a manner not shown. The pull-out element 42 can be held in a standby position shown in FIGS. 1, 3, 8 and 9 with the aid of holding means 43 provided in the device 2. In its standby position the pull-out element 42 can be coupled to the coupling element 17 of the inserted cassette 3 when this coupling element is in its coupling position. In this way, it is achieved that by rotationally driving the take-up reel 38—which is effected by means of the reel drive motor not shown—the coupling element 17 and, consequently, the magnetic tape 13 can be pulled out of the inserted cassette 3 in an pull-out direction indicated by an arrow 44 in FIGS. 1, 3, 4, 5, 6, 7, 8 and 9 and can be pulled along the tape transport path 29 up to the take-up reel 38 with the aid of the take-up reel 38, the pull-out tape 41, the pull-out element 42 and the coupling element 17 of the inserted cassette 3, when coupled to the pull-out element 42.

Advantageously, the device 2 in the system 1 comprises a movable cassette holder 45, whose construction is apparent from FIG. 2. The movable cassette holder 45 constitutes actuating means capable of producing a relative movement—in a direction of movement indicated by an arrow 46 in FIG. 2 and oriented transversely to the main walls 7 and 8 of the cassette 3—between the cassette 3 and the pull-out element 42 of the device 2, which element is held in its standby position with the aid of the holding means 43, during an insertion process of the cassette 3, at least towards the end of the insertion process. In the present case this relative movement is effected by lowering the cassette 3 towards the chassis 28 of the device 2 in a direction indicated by an arrow 46.

As is apparent from FIG. 2, the movable cassette holder 45 comprises an upper wall 47, two side walls 48, which project from the upper wall 47 towards the chassis 28, and two strip-shaped bottom wall sections 49, which each project from a side wall 48 and are directed towards the other side wall 48. The two bottom wall sections 49 carry a cassette 3 inserted into the cassette holder 46, a spring not shown in FIG. 2 and connected to the upper wall 47 urging the inserted cassette 3 against the bottom wall sections 49 in order to guarantee a reliable positioning and holding of the cassette 3 in the cassette holder 45.

Two actuating rollers 50 and 51 project laterally from each of the side walls 48 of the movable cassette holder 45. The actuating rollers 50 and 51 engage inclined actuating slots 52 and 53 formed in the two side flanges 54 and 55 of an essentially U-shaped actuating slide 56 whose web 57, which extends parallel to the chassis 28, is guided so as to be movable parallel to the direction of insertion of the cassette 3 into the cassette holder 45, as indicated by an arrow 60 in FIGS. 1 and 2, with the aid of guide rollers which are rotatably supported in the chassis 28 and of which the two guide rollers 58 and 59 are visible in FIG. 1. The web 57 has an aperture 61 to allow the passage of the reel drive device 27. The actuating rollers 50, which both project laterally from the two side walls 48 of the cassette holder 45 and which are situated nearer the loading aperture of the device 2 for the passage of the cassette 3, each engage a guide slot 63 formed in a side wall portion 62 of the chassis 28. The two guide slots 63, of which only one guide slot 63 is visible in FIG. 2, guide the cassette holder 45 so as to be slidable in a direction parallel to that indicated by the arrow 46.

The actuating slide 56 cooperates with a latching lever 64, which is supported on the chassis 28 so as to be pivotable about a spindle 65. The latching lever 64 is movable between a latching position shown in FIG. 1 and a release position shown in FIGS. 3 and 4. A first return spring, not shown, acts on the latching lever 64 and tends to keep the latching lever 64 in its latching position. The latching lever 64 has a resilient arm 66 which projects into the path of movement of the cassette 3 during insertion of this cassette into the movable cassette holder 45. The latching lever 64 further comprises a latching projection 67, which faces a latching stop 68 of the actuating slide 56. A second return spring, not shown in the Figures, acts upon the actuating slide 56 and exerts a spring-load on the actuating slide 56 against the direction of insertion, so that the latching stop 68 of the actuating slide 56 is resiliently urged against the latching projection 67 of the latching lever 64 when the latching lever 64 is in its latching position shown in FIG. 1.

Figure 1:
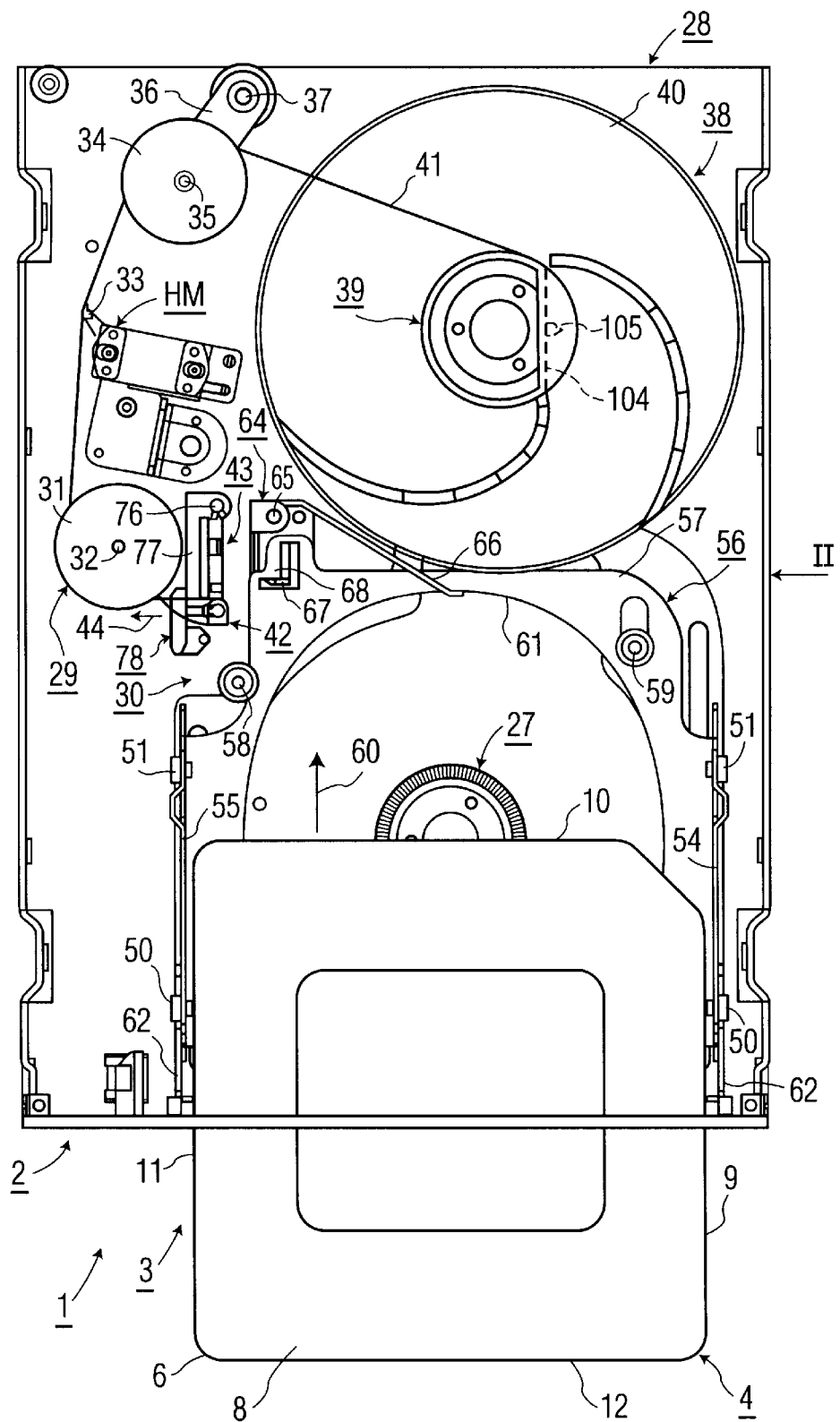
FIG. 1 is a plan view of a recording and reproducing system embodying the invention and comprising a recording and reproducing device and a cassette which can be loaded into this device, the recording and reproducing device having actuating means, namely a movable cassette holder for holding the cassette, but this cassette holder is not shown in FIG. 1.

When a cassette 3 is inserted into the cassette holder 45 in the direction indicated by the arrow 60 as shown in FIG. 1, the cassette 3 abuts against the resilient arm 66 of the latching lever 64 towards the end of this insertion process, thereby causing the latching lever 64 to be pivoted counter-clockwise as shown in FIG. 1, so that the latching projection 67 is disengaged from the latching stop 68 of the actuating slide 56, as a result of which the actuating slide 56 is moved in a direction opposite to that indicated by the arrow 60 under the influence of the second return spring which acts upon this slide, namely into the position shown in FIGS. 3 and 4, in which an actuating projection 69 on the actuating slide 56 projects from the device 2. During this movement of the actuating slide 56 in a direction opposite to that indicated by the arrow 60 the actuating slots 52 and 53 cause the actuating rollers 50 and 51 to be lowered in the direction indicated by the arrow 46 and, as a consequence, the cassette holder 45 and the cassette 3 in this holder are moved in the direction indicated by the arrow 46. As a result of this, the reel drive device 27 engages with the supply reel 15 in the cassette 3, the supply reel 15 being lifted into its drive position, in which the supply reel 15 no longer lies on the bottom wall 7 of the cassette 3 and, consequently, is no longer locked against rotation by the latching teeth 23, 24, 25 and 26 and can thus be set into rotation.

In order to allow an inserted cassette 3 to be removed from the device 2 of the system 1 a user should move the actuating projection 69 of the actuating slide 56 in the direction indicated by the arrow 60, the actuating slide 56 then being moved in the direction indicated by the arrow 60 opposed by the force of the second return spring which acts upon this slide and the cassette holder 45 being moved away from the chassis 28 via the actuating slots 52 and 53 and the actuating rollers 50 and 51 in a direction opposite to that indicated by the arrow 46. As soon as the actuating slide 56 has moved far enough in the direction indicated by the arrow 60, the latching lever 64 is pivoted back into its latched position shown in FIG. 1 in the clockwise direction under the influence of the first return spring which acts upon this lever, in which latched position the latching projection 67 of the lever blocks the actuating slide 56 via the latching stop 68 of the actuating slide 56. During this clockwise pivotal movement of the latching lever 64 the resilient arm 66 of the latching lever 64 causes the cassette 3 to be moved slightly out of the cassette holder 45, i.e. out of the device 2, so that the cassette 3 can readily be removed.

By means of the movable cassette holder 45 described above it is possible—as already stated in the foregoing—to obtain the relative movement between the cassette 3 and the chassis 28, which movement is oriented in a direction transverse to the mains walls 7 and 8 of the cassette 3 as indicated by the arrow 46, and consequently between the coupling element 17, which is positioned in its coupling position in the cassette 3 with the aid of the positioning means 18, and the pull-out element 42, which is held in its standby position with the aid of the holding means 43. In the system 1 as shown in FIGS. 1 to 4 the coupling element 17 of the cassette 3 and the pull-out element 42 of the device 2 advantageously also comprise coupling means 70 which are adapted to automatically establish a coupling, without additional means being required, during said relative movement in which the coupling element 17 of the cassette 3 is positioned in its coupling position with the aid of the positioning means 18 and the pull-out element 42 of the device 2 is held in its standby position with the aid of the holding means 43. For the coupling means 70 reference is made, in particular, to FIGS. 5 and 7.

Figure 5:
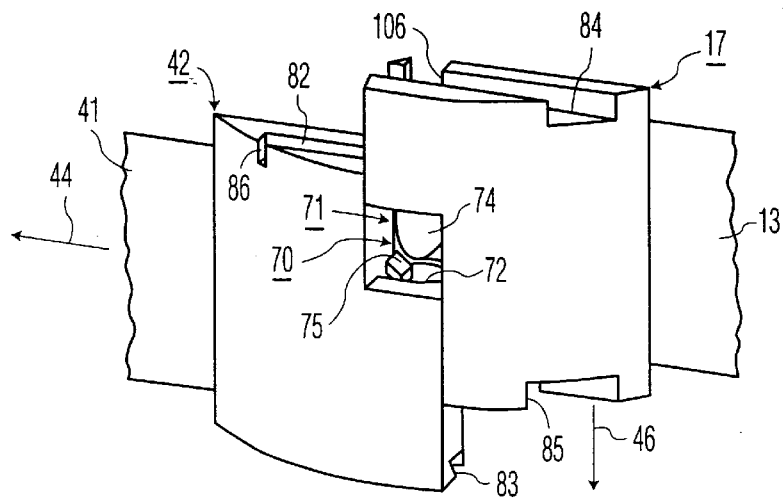
FIG. 5 is an oblique view of the pull-out element of the recording and reproducing device and the coupling element of the cassette when these two elements have not yet been coupled to one another.
Figure 6:
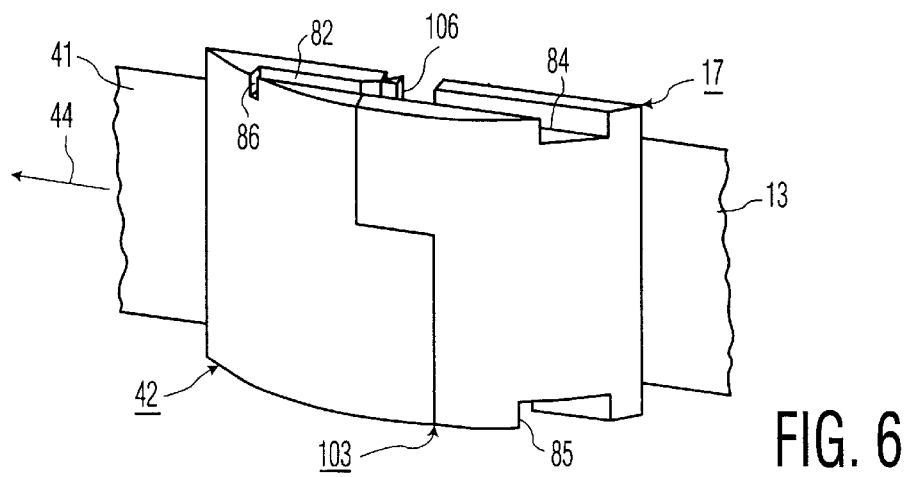
FIG. 6, similarly to FIG. 5, shows the pull-out element and the coupling element when these two elements have been coupled to one another.

In FIG. 5 the pull-out element 42 is shown in its standby position and the coupling element 17 is shown in its coupling position. As a result of the movement of the coupling element 17 when the cassette holder 45 is lowered towards the chassis 28 as indicated by the arrow 46 the coupling means 70 of the pull-out element 42 and of the coupling element 17 are automatically coupled, which condition is shown in FIG. 6.

Figure 7:
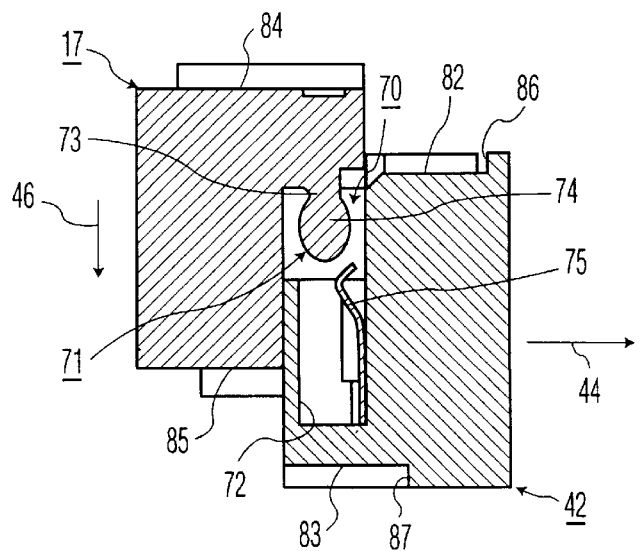
FIG. 7 shows the pull-out element and the coupling element in a sectional view from which the construction of the coupling means of these two elements is apparent.

As is apparent particularly from FIG. 7, the coupling means 70 of the coupling element 17 and of the pull-out element 42 are formed by a coupling pin 71, which is connected to the coupling element 17 and which projects from the coupling element 17 parallel to said direction of movement indicated by the arrow 46 and, consequently, transversely to the mains walls 7 and 8 of the cassette 3, and by a coupling hole 72, which is formed in the pull-out element 42 and which extends parallel to said direction of movement indicated by the arrow 46 and, consequently, transversely to the mains walls 7 and 8 of the cassette 3. During said relative movement between the pull-out element 42 and the coupling element 17 and between the cassette 3 and the device 2 the coupling pin 71 can be introduced into the coupling hole 72 as indicated by the arrow 46. As is further apparent from FIG. 7, the coupling pin 71 has a distal portion 74 which is thicker than its proximal portion 73 which adjoins the coupling element 17. In the coupling hole 72 of the pull-out element 42 a spring-loaded latching element 75 is disposed, which in the present case is very simply formed by a blade spring having a V-shaped free end portion and which engages behind the distal portion 74 of the coupling pin 71 when the coupling pin 71 is introduced into the coupling hole 72, which situation is not shown in the Figures but is quite evident.

To ensure that the pull-out element 42 is always reliably and correctly coupled to the coupling element 17 it is important that the pull-out element 42 is always accurately and correctly held in its standby position and the coupling element is always accurately and correctly positioned in its coupling position in the cassette 3. In view of this, the construction and operation of the holding means 43 for holding the pull-out element 42 in its standby position is described in more detail hereinafter, particularly with reference to FIGS. 8 and 9.

The holding means 43 provided for the pull-out element 43 in the device 2 comprise a carrier lever 77 which is pivotable about a pivot 76. The pivot 76 extends parallel to the direction of said relative movement indicated by the arrow 46 and is mounted in the chassis 28, from which it projects in the afore-mentioned direction. The carrier lever 77 is connected to a substantially U-shaped holding element 78, which comprises two holding limbs 79, which extend transversely to the pivot 76 and of which only the upper holding limb 79 is visible in FIGS. 8 and 9, and a connecting limb 80, which interconnects the two holding limbs 79 and which extends parallel to the pivot 76. By means of the two holding limbs 79 the pull-out element 42 can be held in its standby position shown in FIGS. 8 and 9. Each of the two holding limbs 79 carries a guide rib 81 which projects towards the other holding limb 79 and of which only the upper guide rib 81 is visible in FIG. 9. The longitudinal directions of the two guide ribs 81 correspond to the pull-out direction 44. The pull-out element 42 has two guide grooves 82 and 83 adapted to cooperate with the two guide ribs 81 for the purpose of guiding and holding the pull-out element 42.

The coupling element 17 has two clearance grooves 84 and 85, which correspond to the two guide grooves 82 and 83 of the pull-out element 42 and which—as soon as the coupling element 17 and the pull-out element 42 are coupled as shown in FIG. 6—are disposed in line with the guide grooves 82 and 83 of the pull-out element 41 parallel to the pull-out direction 44. This guarantees that the coupling element 17 is withdrawn from the cassette 3 in a reliable manner and without being obstructed by the guide ribs 81.

As is apparent from the FIGS. 5, 6 and 7, the two guide grooves 82 and 83 of the pull-out element 42 are each bounded by a bounding wall 86 or 87, respectively, at their ends nearer the pull-out tape 41, which bounding walls extend transversely to the pull-out direction 44. By means of the two bounding walls 86 and 87 the travel of the pull-out element 42 in a direction opposite to the pull-out direction 44 can be limited because the two bounding walls 86 and 87 abut against the guide ribs 81 during a movement of the pull-out element 42 in a direction opposite to the pull-out direction 44.

With respect to the holding means 43 it is to be noted that a movable latching element 88 is connected to the carrier lever 77 of the holding means 43. In the present case the latching element 88 of the holding means 43 is formed by a wire spring having an offset portion. The wire spring forming the latching element 88 has one end 89 inserted into a recess in the pivot 76 and its central portion is passed over a projection 90 on the carrier lever 77, so that the wire spring is pre-tensioned, thereby causing a further portion 91 of the wire spring to abut against an L-shaped hold-down member 92 in the absence of a cassette 3, the wire spring constituting the latching element 88 then assuming a latching position. The wire spring constituting the latching element 88 is movable from this latching position into a release position, shown in FIG. 9, by means of the cassette 3 during said relative movement in the direction indicated by the arrow 46.

The pull-out element 42 comprises latching means 93 adapted to cooperate with the latching element 88 of the holding means 43. In the present case the latching means 93 of the pull-out element 42 are constituted by a recess formed in the pull-out element.

When the latching element 88 is in its latching position, which is not directly discernible in the Figures, the pull-out element 42, when in its standby position, is locked against a movement in the pull-out direction 88 with the aid of the latching element 88 of the holding means 43 and the latching means 93 of the pull-out element 42. The latching element 88 is moved from its latching position into its release position shown in FIG. 9 by means of the cassette 4 via its substantially U-shaped free end 94, only when a cassette 3 has been loaded into the device 2, in which case the relevant portion of the latching element 88 is moved out of the recess forming the latching means 93 of the pull-out element 42, thus enabling the pull-out element 42 to be moved in the pull-out direction 44.

The plastic carrier lever 77 comprises an integral bar spring 95 whose free end 96 abuts against a stop pin 97 which projects from the chassis 28. The bar spring 95 can resiliently load the carrier lever 77 and, consequently, the U-shaped holding element 78, which is integral with the carrier lever 77, in the direction indicated by an arrow 98 in FIG. 8. By means of this resilient load provided by the bar spring 95 the carrier lever 77 and the holding means 43 can be held in the holding position shown in FIG. 8 with the aid of means not shown. In this holding position of the holding means 43 the pull-out element 42 is in its standby position.

Another advantageous feature of the holding means 43 is that the holding limb 79 of the U-shaped holding element 78 carries an actuating projection 99, which projects from the holding limb 79 substantially in a direction opposite to the pull-out direction 44 and from which a substantially circularly cylindrical actuating pin 100 projects. By means of the actuating projection 99, i.e. by means of the actuating pin 100 which projects from this actuating projection 99, the coupling element 17 disposed in the inserted cassette 3 can be moved to the positioning means 18 for the coupling element 17. This movement of the coupling element 17 to the positioning means 18 is performed during insertion of the cassette 3 into the movable cassette holder 45, namely towards the end of this insertion process. This is achieved in that towards the end of the insertion process a rounded wall portion 101 of the coupling element 17 strikes against the actuating pin 100, after which the actuating pin 100 is moved in the pull-out direction 44 by the coupling element 17, so that subsequently the actuating pin 100 slides over the wall portion 102 of the coupling element 17, which wall portion extends perpendicularly to the pull-out direction 44. By means of the actuating pin 100 the actuating projection 99 and, consequently, the U-shaped holding element 78 as well as the carrier lever 77 are moved in a direction opposite to the direction indicated by the arrow 98 and opposed by the force of the bar spring 95 out of the standby position into a press-on position, not shown in FIG. 8, in which the bar spring 95, whose free end 96 acts upon the stop pin 97, exerts a spring force on the actuating pin 100 via the carrier lever 77, the U-shaped holding element 78 and the actuating projection 99, which spring force is transmitted to the coupling element 17 via the wall portion 102, so that the coupling element 17 is urged into the positioning means 18 by spring force and is thus positioned properly into its coupling position before the coupling element 17 is moved towards the pull-out element 42 in the direction indicated by the arrow 46 and before the coupling means 70 of the coupling element 17 and of the pull-out element 42 engage with one another to effect coupling.

Since the coupling element 17 is accurately positioned into its coupling position in the cassette 3 in the manner described hereinbefore and the pull-out element 42 is also accurately held in its standby position in the device 2 a reliable and correct coupling of the coupling means 70 and, consequently, of the pull-out element 42 and the coupling element 17 is achieved during the relative movement in the direction indicated by the arrow 46.

With respect to the system 1 it is to be noted also that—as is apparent particularly from FIGS. 3, 4, 6, 8, 9 and 10—the coupling element 17 and the pull-out element 42—once these two elements 17 and 42 have been coupled—form an assembly of circularly segment-shaped cross-section. This assembly 103 is engageable in a recess 104 of corresponding segment shape formed in the reel hub 39 of the take-up reel 38 of the device 2, as is apparent from FIG. 4 and particularly from FIG. 10.

Figure 10:
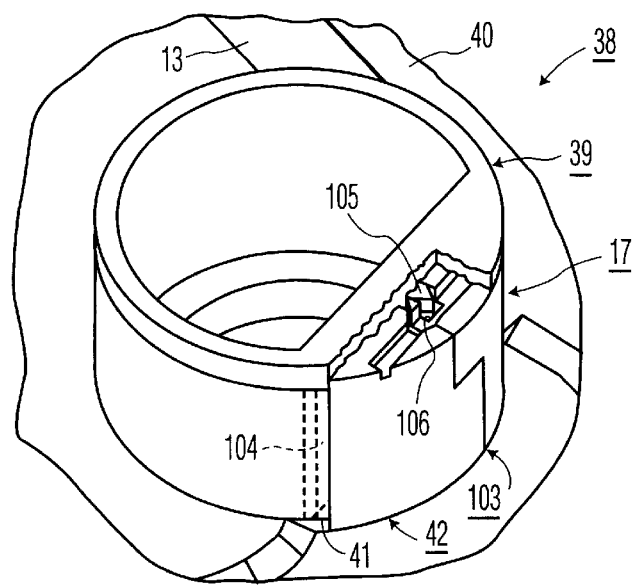
FIG. 10 is an oblique view of the reel hub of the take-up reel of the recording and reproducing device of the recording and reproducing system shown in FIGS. 1 to 4, the pull-out element and the coupling element coupled to the pull-out element having engaged the segment-shaped recess in the reel hub.

As is further apparent from FIG. 10, a positioning wedge 105, which engages the recess 104 in the reel hub 39, is attached to the reel hub 39. Either the coupling element 17 or the pull-out element 42, in the present case the coupling element 17, has a positioning recess 106, as is apparent in particular from FIG. 9, in which recess the positioning wedge 105 has been inserted—while the assembly 103 is situated in the recess 104 of the reel hub 39 of the take-up reel 38—in order to position the assembly 103 on the reel hub 39 of the take-up reel 38. By means of the positioning wedge 105 and the positioning recess 106 a very exact positioning of the assembly 103 on the reel hub 39 is guaranteed.

Furthermore, it is to be noted that a few layers of pull-out tape are present in the substantially plane separating zone between the reel hub 39 of the take-up reel 38 and the assembly 103 comprising the pull-out element 42 and the coupling element 17 when the assembly 103 is disposed in the reel hub 39.

With a recording and reproducing system 1 in accordance with the invention it is achieved in a particularly simple and, consequently, very cheap manner that for coupling the pull-out element 42 arranged in the device 2 and the coupling element 17 arranged in the cassette 3 no additional means are required apart from these two elements 17 and 42 themselves because coupling of these two elements 17 and 42 is effected automatically, without any additional means being required, towards the end of an insertion process of a cassette into the device 2.

The invention is not limited to the embodiment described by way of example in the foregoing. For example, it is alternatively possible to use differently constructed coupling means between a coupling element of a cassette and a pull-out element of a device. Moreover, a variety of differently constructed means are available for the implementation of the positioning means for the coupling element of a cassette as well as for the implementation of the holding means for holding the pull-out element of a device.

What is claimed is:

1. A recording and/or reproducing system, comprising a recording and/or reproducing device and a cassette which is insertable into the device, the cassette comprising a cassette housing having at least one main wall; a supply reel in the housing, rotatable about an axis transverse to said at least one main wall; a length of tape wound at least partially on the supply reel, the tape having one end connected to the reel; a coupling element connected to the other end of the tape; and positioning means for retaining the coupling element in a coupling position, and the device comprising:
   a device housing,
   means defining an insertion path along which the cassette can be inserted into a compartment within the device housing for receiving the cassette,
   a rotationally drivable take-up reel for taking up the tape,
   a pull-out element connected to one end of a pull-out tape, the other end of the pull-out tape being connected to the take-up reel,
   holding means for holding the pull-out element in a standby position, and
   actuating means for producing relative movement, in a first direction of movement transverse to the main walls of the cassette, between the cassette and said device pull-out element during a portion of movement along said insertion path,
characterized in that the device further comprises means movably connecting said holding means to said housing, for permitting relative movement between said holding means and said housing in a said direction of movement transverse to said first direction of movement, and
said coupling element and said pull-out element together comprise coupling means for automatically coupling the elements together during said relative movement, said coupling element being disposed in its coupling position by said positioning means, and the pull-out element being held in its standby position by said holding means.

2. A system as claimed in claim 1, characterized in that said coupling means is formed by a coupling pin connected to one of said elements and extending in a direction parallel to the direction of relative movement, and a coupling hole in the other of said elements, said coupling hole extending parallel to the direction of relative movement, during the relative movement the coupling pin engaging in the coupling hole, and the coupling pin has a proximal portion which adjoins said one of said elements, and a distal portion, the distal portion having a thickness greater than the thickness of the proximal portion.

3. A system as claimed in claim 1, characterized in that said one of said elements is said coupling element, said other of said elements is said pull-out element and comprises a spring-loaded latching element disposed in the coupling hole, arranged to engage behind said distal portion when the coupling pin has engaged the coupling hole.

4. A system as claimed in claim 1, characterized in that said means for movably connecting comprises a pivot which extends parallel to said first direction of relative movement, a carrier lever which is pivotable about said pivot, and means for urging said carrier lever in said second direction.

5. A system as claimed in claim 1, characterized in that said holding means comprises a substantially U-shaped holder connected to said lever,
    said holder comprising two holding limbs which extend transversely to said pivot, and a connecting limb which extends parallel to said pivot and interconnects the two holding limbs carrier lever, said holding limbs being arranged to hold the pull-out element in the standby position.

6. A system as claimed in claim 5, characterized in that each of the two holding limbs includes a guide rib which projects toward the other holding limb, said guide ribs extending substantially in a pull-out direction, and
    the pull-out element has two guide grooves arranged to cooperate respectively with the guide ribs for guiding and holding the pull-out element.

7. A system as claimed in claim 6, characterized in that the coupling element has two clearance grooves which, upon coupling of the coupling element to the pull-out element while the pull-out element is in the standby position, are disposed in line with the guide grooves of the pull-out element.

8. A system as claimed in claim 6, characterized in that each of said guide grooves has respective ends spaced from and nearer the pull-out tape, and bounding walls bounding the respective ends which are nearer the pull-out tape, said bounding walls extending transversely to the pull-out direction to limit travel of the pull-out element in a direction opposite the pull-out direction.

9. A system as claimed in claim 5, characterized in that the device further comprises a movable latching element connected to said carrier lever, during said relative movement of the cassette the movable latching element being moved from a latching position into a release position, and
    the pull-out element comprises latching means arranged to cooperate with said movable latching element,
    when the latching element is in its latching position and the pull-out element is in its standby position, the latching element and the latching means cooperate to lock the pull-out element against movement in the pull-out direction.

10. A system as claimed in claim 9, characterized in that the latching element of the holding means is formed by a wire spring having an offset portion, and the latching means of the pull-out element includes a recess formed in the pull-out element.

11. A system as claimed in claim 5, characterized in that the device further comprises an actuating projection carried on one of said holding limbs, projecting substantially in a direction opposite the pull-out direction, said actuating projection being arranged to move the coupling element to said positioning means.

12. A system as claimed in claim 1, characterized in that the coupling element and the pull-out element, when coupled together, form an assembly of circularly segment-shaped cross-section, and
    the take-up reel has a hub having a hub perimeter with a recess therein, said recess having a corresponding segment-shaped cross-section, said assembly being engageable in said recess to create a circular cylindrical hub perimeter.

13. A system as claimed in claim 12, characterized in that the device further comprises a positioning wedge attached to the reel hub, and one of said elements has a positioning recess in which the position wedge is inserted while the assembly is engaged in the hub recess.

14. A recording and/or reproducing device, arranged for receiving a cassette comprising a cassette housing having at least one main wall; a supply reel in the housing, rotatable about an axis transverse to said at least one main wall; a length of tape wound at least partially on the supply reel, the tape having one end connected to the reel; a coupling element connected to the other end of the tape; and positioning means for retaining the coupling element in a coupling position,
    said device comprising:
        a device housing,
        means defining an insertion path along which the cassette can be inserted into a compartment within the device housing for receiving the cassette,
        a rotationally drivable take-up reel for taking up the tape,
        a pull-out element connected to one end of a pull-out tape, the other end of the pull-out tape being connected to the take-up reel,
        holding means for holding the pull-out element in a standby position, and
        actuating means for producing relative movement, in a first direction of movement transverse to the main walls of the cassette, between the cassette and said device pull-out element during a portion of movement along said insertion path,
    characterized in that the device further comprises means movably connecting said holding means to said housing, for permitting relative movement between said holding means and said housing in a said direction of movement transverse to said first direction of movement, and
    said coupling element and said pull-out element together comprise coupling means for automatically coupling the elements together during said relative movement, said coupling element being disposed in its coupling position by said positioning means, and the pull-out element being held in its standby position by said holding means.

15. A recording and/or reproducing device as claimed in claim 14, characterized in that said coupling means is formed by a coupling pin connected to one of said elements and extending in a direction parallel to the direction of relative movement, and a coupling hole in the other of said elements, said coupling hole extending parallel to the direction of relative movement, during said relative movement the coupling pin engaging in the coupling hole, and
    the coupling pin has a proximal portion which adjoins said one of said elements, and a distal portion, the distal portion having a thickness greater than the thickness of the proximal portion.

16. A recording and/or reproducing device as claimed in claim 15, characterized in that said other of said elements comprises a spring-loaded latching element disposed in the coupling hole, arranged to engage behind said distal portion when the coupling pin has engaged the coupling hole.

17. A recording and/or reproducing device as claimed in claim 14, characterized in that said means for movably connecting comprises a pivot which extends parallel to said first direction of relative movement, a carrier lever which is pivotable about said pivot, and means for urging said carrier lever in said second direction.

18. A recording and/or reproducing device as claimed in claim 14, characterized in that said holding means comprises a substantially U-shaped holder connected to said lever, said holder comprising two holding limbs which extend transversely to said pivot, and a connecting limb which extends parallel to said pivot and interconnects the two holding limbs carrier lever, said holding limbs being arranged to hold the pull-out element in the standby position.

19. A recording and/or reproducing device as claimed in claim 18, characterized in that each of the two holding limbs includes a guide rib which projects toward the other holding limb, said guide ribs extending substantially in a pull-out direction, and the pull-out element has two guide grooves arranged to cooperate respectively with the guide ribs for guiding and holding the pull-out element.

20. A recording and/or reproducing device as claimed in claim 19, characterized in that each of said guide grooves has respective ends spaced from and nearer the pull-out tape, and bounding walls bounding the respective ends which are nearer the pull-out tape, said bounding walls extending transversely to the pull-out direction to limit travel of the pull-out element in a direction opposite the pull-out direction.

21. A recording and/or reproducing device as claimed in claim 18, characterized in that the device further comprises a movable latching element connected to said carrier lever, during said relative movement of the cassette the movable latching element being moved from a latching position into a release position, and the pull-out element comprises latching means arranged to cooperate with said movable latching element, when the latching element is in its latching position and the pull-out element is in its standby position, the latching element and the latching means cooperate to lock the pull-out element against movement in the pull-out direction.

22. A recording and/or reproducing device as claimed in claim 21, characterized in that the latching element of the holding means is formed by a wire spring having an offset portion, and the latching means of the pull-out element includes a recess formed in the pull-out element.

23. A recording and/or reproducing device as claimed in claim 18, characterized in that the device further comprises an actuating projection carried on one of said holding limbs, projecting substantially in a direction opposite the pull-out direction, said actuating projection being arranged to move the coupling element to said positioning means.

24. A recording and/or reproducing device as claimed in claim 14, characterized in that the coupling element and the pull-out element, when coupled together, form an assembly of circularly segment-shaped cross-section, the take-up reel has a hub having a hub perimeter with a recess therein, said recess having a corresponding segment-shaped cross-section, said assembly being engageable in said recess to create a circular cylindrical hub perimeter.

25. A recording and/or reproducing device as claimed in claim 24, characterized in that the device further comprises a positioning wedge attached to the reel hub, and one of said elements has a positioning recess in which the position wedge is inserted while the assembly is engaged in the hub recess.

26. A cassette comprising a cassette housing having at least one main wall; a supply reel in the housing, rotatable about an axis transverse to said at least one main wall; a length of tape wound at least partially on the supply reel, the tape having one end connected to the reel; a coupling element connected to the other end of the tape; and positioning means for retaining the coupling element in a coupling position, in said coupling position the coupling element being arranged for coupling to a pull-out element of a scanning device as a result of relative movement of the cassette with respect to the pull-out element in a direction transverse to said main wall, characterized in that the coupling element has a wall which is circular cylindrical about an axis transverse to said main wall, and the coupling element has a circular segment-shaped cross-section which after coupling to a similarly shaped pull-out element, and pull-out from the cassette, can engage a recess in a take-up reel hub to provide a circular cylindrical periphery of the reel hub.

27. A cassette as claimed in claim 26, characterized in that the coupling element comprises a coupling pin which projects from the coupling element transversely to the main wall, and said pin has a proximal portion which adjoins said coupling element, and a distal portion, the distal portion having a thickness greater than the thickness of the proximal portion, said distal portion being arranged for engagement by a spring-loaded latching element in a coupling hole of the pull-out element.

28. A cassette as claimed in claim 26, characterized in that the coupling element has at least one clearance groove which, when the coupling element is in a coupling position, is disposed substantially parallel to said main wall and in line with a pull-out direction.

* * * * *